United States Patent [19]

Misiura et al.

[11] 4,285,369
[45] Aug. 25, 1981

[54] THERMAL INSULATION ENHANCEMENT

[75] Inventors: Thaddeus D. Misiura, Princeton Junction, N.J.; Gordon K. Lambert, Starkville, Miss.

[73] Assignee: Parker-Hannifin Corporation, Cleveland, Ohio

[21] Appl. No.: 110,862

[22] Filed: Jan. 9, 1980

Related U.S. Application Data

[63] Continuation of Ser. No. 874,980, Feb. 3, 1978, abandoned, which is a continuation of Ser. No. 709,038, Jul. 27, 1976, abandoned.

[51] Int. Cl.$^3$ ............................................. F16L 11/12
[52] U.S. Cl. ..................................... 138/149; 138/111
[58] Field of Search ........................ 138/111, 148, 149

[56] References Cited

U.S. PATENT DOCUMENTS

| | | | |
|---|---|---|---|
| 332,258 | 12/1885 | Lamkin | 138/149 |
| 417,768 | 12/1889 | Bartlett | 138/149 |
| 1,045,459 | 11/1912 | Todd et al. | 138/149 |
| 3,529,632 | 9/1970 | Johns | 138/111 |
| 3,853,149 | 12/1974 | Stine | 138/111 |
| 3,981,689 | 9/1976 | Trelease | 138/149 X |
| 4,194,536 | 3/1980 | Stine et al. | 138/149 |

*Primary Examiner*—James E. Bryant, III
*Attorney, Agent, or Firm*—James A. Baker; Russell E. Baumann

[57] ABSTRACT

A core element, as for example a pipe, tube, hose or the like, has thermal insulation applied thereto in the form of a plurality of layers of tape applied in a continuous process in which conditions are selected to deliberately create wrinkles thereby defining air spaces serving to further reduce the transmission of heat through the composite thermal insulation. The wrinkles may be introduced by wrapping the tape about the pipe at an applied angle greater or smaller than the angle required for a given effective diameter, overlap factor, and width of tape, At the outer surface of the wrap the tape is substantially wrinkle-free and a jacket of polyvinyl chloride or the like is applied thereto. The difference between a theoretical angle of application calculated to produce a wrinkle-free wrap, and an actual angle of application, is progressively lowered in a direction radially outwardly from the tube or other core element, thus causing the wrinkles to become, correspondingly, more and more pronounced in a direction radially inwardly from the jacket. In turn, the air spaces or voids are thereby caused to become progressively enlarged in the radial inward direction, becoming maximized at the surface of the core, that is, at the precise location which has the highest thermal gradient.

6 Claims, 2 Drawing Figures

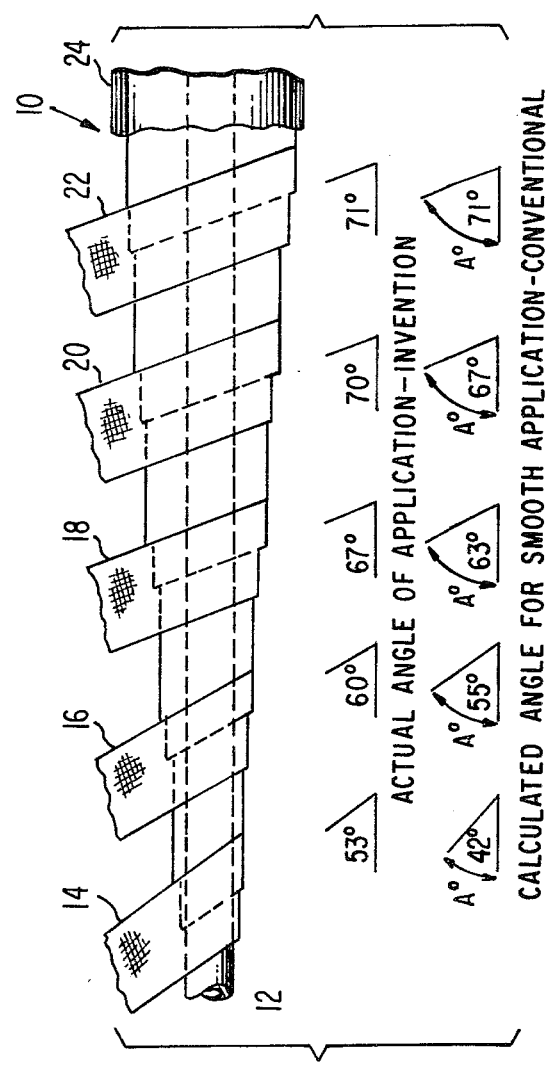

THERMAL INSULATION ENHANCEMENT

This is a continuation of application Ser. No. 874,980, filed Feb. 3, 1978, now abandoned, which in turn is a continuation of application Ser. No. 709,038, filed July 27, 1976, now abandoned.

BACKGROUND OF THE INVENTION

1. Field of the Invention

Prefabricated thermal insulated tubing has wide ranging application in industry, and in particular the chemical process industry, wherein fluids passing through metallic or plastic tubing must be maintained as closely as possible to specified temperatures during flow over substantial distances, often in hostile environments. In such instances, the fluid must be protected against wide excursions of ambient temperature conditions. Common protective methods involve applying insulation about the tubing, for example by coating the tubing with insulation by an extrusion process and/or by applying successive layers of materials having inherently low thermal conductivity properties.

The present invention is thought to be properly classified in the field of tubing, pipe or conduit products of the type thermally insulated through the provision of distinct layers or wraps of thermal insulation materials.

2. Description of the Prior Art

In applying successive layers of materials, by a process described as "taping" to those knowledgeable in the wire and cable industry, great care is exercised, typically, to maintain a smooth covering of the taping materials. By means of this careful, smooth application, voids are minimized and dielectric strength is maximized.

This is generally accomplished by proper adjustment of the tape let-off device, tape-pad holder, so that the angle formed between the horizontal and the tape being dispensed is equal to the angle of the tape being applied to the substrate being taped. The required angles for a given condition of tape application are readily calculated from geometrical considerations of the tape overlap, the width of the tape, the thickness of the tape, the resiliency of the tape, and the dimensions of the object being taped.

In contrast, an essential goal of thermal insulating materials is to introduce as much air into the volume as is possible, consistent with other mechanical or dimensional properties required for the product. Thus, it becomes possible to reduce the thermal conductivity properties of the insulating material, thereby increasing the efficiency of the thermal insulation.

Thermally insulated tubing products are disclosed, for example, in U.S. Pat. Nos. 3,269,422; 3,400,737; and 3,315,703. Typically, such products are produced by manufacturers of heavy duty wire and cable, since their machinery is well suited for manufacturing both thermally insulated, jacketed tubing and electrically insulated, jacketed wire and cable.

However, as noted above, the taping procedures normally employed in producing electrical cable, though well suited for that purpose, do not serve to achieve the above stated goal in the manufacture of tubing products carrying fluids the temperature of which is to be maintained, namely, the goal of introducing air into the volume of insulation to reduce the normal thermal conductivity properties of the insulating wrap.

SUMMARY OF THE INVENTION

The ability to introduce a large volume of air into a taped thermal insulation is accomplished, in accordance with the present invention, by deliberately introducing wrinkles into the thermal insulation during the taping process, at random locations, in a breakaway from the traditional smooth application described above. Summarized briefly, in carrying out our invention we select actual angles of application which differ from the angles calculated to produce a smooth application, with the difference being most pronounced at the innermost layer or wrap of the tape and being reduced for each successively applied layer until it becomes non-existent as to the outermost wrapping. In the innermost wrap, the wrinkles are most pronounced, so that the air spaces defined thereby are comparatively large. Then, in the next layer or application of the wrapping of the tape, they are caused to be somewhat smaller to reduce the air gap size correspondingly. Smaller wrinkles, and hence smaller air spaces, appear in the next following wrap. Increasing reduction in wrinkle (and air space) size is deliberately created in succeeding layers until in the final layer, the wrapping is almost perfectly circular, is to all intents and purposes devoid of wrinkles, and is therefore ready for application of the usual circular jacket.

BRIEF DESCRIPTION OF THE DRAWING

FIG. 2 is a longitudinal view of a portion of the construction shown in FIG. 1.

DESCRIPTION OF THE PREFERRED EMBODIMENT

Figure 1:
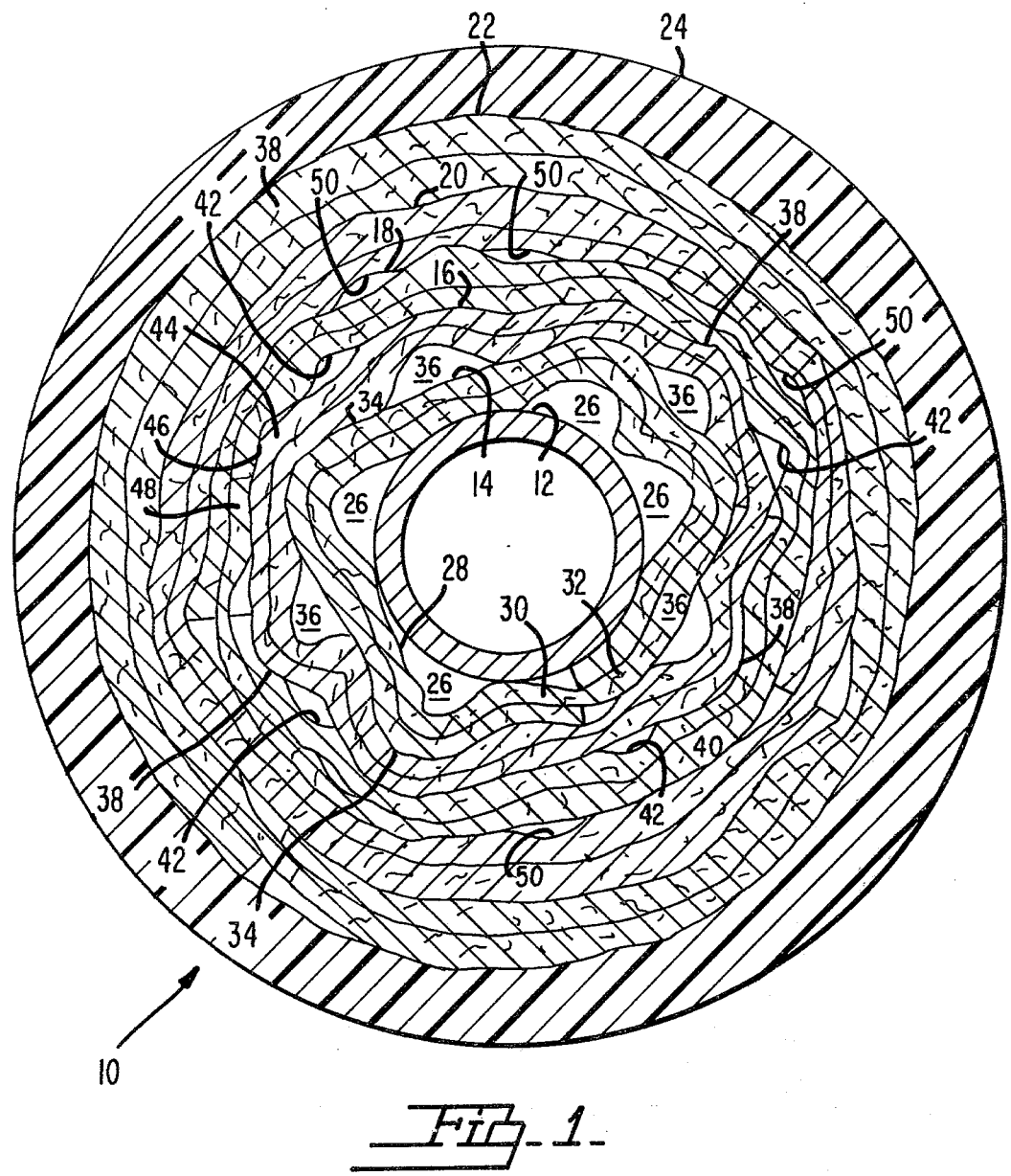
FIG. 1 is a cross-sectional view of a typical thermally insulated tubing product provided with thermal insulation according to the present invention, the tape thicknesses, the tape ends, and the wrinkling effect being exaggerated to facilitate an understanding of the invention.

In the embodiment of the invention chosen for purposes of illustration in FIG. 1, the insulated tubing product formed according to the invention has been generally designated by the reference numeral 10, and includes a core element 12 in the form of a pipe, tube, hose or equivalent tubular element. This, in a typical commercial embodiment, would be formed of a metallic material such as copper, stainless steel, or the like, but alternatively could be formed of a plastic material if desired. In commercial embodiments of the invention, this might, for example, be utilized as a sampling or process line, adapted to serve in conveying a fluid, either liquid or gas, from one point to another, as for example to an automatically operable, continuous sampling instrument—typically, a chromatograph or infrared spectrograph. Fluid samples taken under these conditions must, in general, be maintained at a substantially constant temperature. This produces problems in that maintenance of such temperature becomes difficult especially where the fluid is being conveyed over comparatively long distances, in hostile, ambient environments.

For this reason, it becomes extremely important to reduce the thermal conductivity coefficient of the insulating wrap applied to the tubular core element, that is to say, given a prescribed outer diameter of the jacketed, complete product and prescribed limitations and specifications as regards cost, flexibility, and durability, to state a few of the factors that must be reckoned with, it is important to provide the maximum thermal insulating efficiency that can be achieved while still maintaining cost and design considerations imposed by the customer.

In the illustrated example, thermal insulation in the form of a plurality of layers of helically wound tape 14, 16, 18, 20, and 22 respectively surround the tube 12 and present a multitude of air spaces or voids. After application of the several tapes, a jacket 24 is applied thereto. Typically, this would be of thermoplastic material, normally PVC or, if desired, of polyethylene or equivalent material. Following taping of the tubular core element, the jacket would be applied by an extrusion process well known in the art.

The taping procedure is carried out, also, by the use of conventional tape-applying mechanisms known in the heavy duty wire, cable, and steam or process line industry, and accordingly need not be described in detail or illustrated herein. It is sufficient, for the purposes of the present application, that the angle at which the tape is applied to the core element can be established by the manufacturer through proper adjustment of the conventional tape let-off device, that is, the tape pad holder and tape guides, to establish a prescribed angle between the horizontal as defined by the length of the core element 12, and the angle at which the tape is dispensed from the tape pad. FIG. 2 shows these angles as determined in accordance with the present invention, and as compared to conventional angles of application.

In carrying out the invention, and referring to FIG. 1, the several tape wrappings are so applied as to define a first or innermost annular series of air spaces 26 occurring randomly about the tubular core 12, and the inner surface 28 of the inner layer 30 of the first or innermost tape 14, said tape 14, in the illustrated, typical embodiment, having, also, an outer layer 32.

The annular series of randomly occurring voids 26 are defined by a corresponding, annular series of randomly occurring, heavily pronounced wrinkles 34 formed during application of the innermost tape 14.

A second, annular series of randomly spaced air gaps 36 is produced, surrounding the first tape 14, by application of a second tape 16 about the first tape, at an angle calculated to produce, again, an annular series of randomly occurring wrinkles 38. These are defined between the outer surface of the outer layer 32 of first tape 14, and the inner surface of the inner layer 40 of the second tape 16.

Of importance is the fact that the total volume of the air spaces 26 of the innermost series of said spaces or gaps is greater than the total volume of the gaps 36 of the second series.

Continuing with a consideration of the construction in a direction radially outwardly from the tubular core element 12, as seen from FIG. 1 a third series of air gaps 42 is defined, again randomly spaced about the core element. Gaps 42 are defined between the outer surface of the outer layer 44 of tape 16, and the inner surface 46 of the inner layer 48 of tape 18.

The total volume of the air spaces or gaps 42 is less than that of the spaces 36.

Application of tape 20 is carried out in a fashion to introduce wrinkles, in the same way that wrinkles are introduced to form gaps 26, 36, and 42. As noted from the preceding description and from FIG. 1, the wrinkles are most pronounced in the innermost or first tape 14, are somewhat less pronounced in the second tape application 16, become yet smaller in the third tape 18, and even more small when randomly formed in the fourth tape 20. In tape 20, the gaps defined by the wrinkles deliberately introduced during application of said tape have been designated at 50. The total volume of this outermost annular series of randomly occurring air gaps is less than that of the series introduced immediately prior thereto, designated at 42.

Finally, the fifth or outermost tape 22 is applied, without deliberate introduction of wrinkles, the angle of application for this tape being calculated to assure smooth application, thereby to produce an outer surface of the taped product that is substantially smooth and circular when viewed in cross section as in FIG. 1. Thereafter, the jacket 24 is extruded over the several, applied tape layers, and will have a correspondingly smooth surface. The final product, when viewed in cross section, thus retains the circular configuration at the outer side of the jacket, that is typical of and is desired for insulated tubing products of this type.

At this juncture, it may be observed that the tape employed preferably is characterized by its low thermal conductivity, and for this purpose may be formed of polyethylene, fiberglass, polyester, "Mylar", laminated asbestos material or the like. Tapes of this type are, of course, well known, and in and of themselves are capable of purchase on the open market.

The preferred method of introducing a randomly wrinkled cross-sectional configuration in the several, applied layers of tape, with progressive reduction in the total volumes of the annular rows of air spaces taken in a direction radially outwardly from the tubular core, is illustrated in FIG. 2. FIG. 2 shows a tubular core 12 that is being covered by a series of five separate tapes. Each is wrapped in turn about the core. In a typical embodiment a half inch copper tube was used as the core element, and was insulated with five half-lapped layers of glass fiber and scrim laminate manufactured by Quin-T Corporation, and identified by that company as "Cable Gard MSMS", the tape width being, for all five tapes, $2\frac{3}{4}$ inches.

In the industry, it has been known that a relationship that specified the proper angle of application, designed to produce a smooth, non-wrinkled surface during the taping procedure, is given by the equation $$\cos A° = \frac{W(\pm L)}{De}$$

Where W is the actual tape width, L is the portion of said width overlapped (and for our example is equal to $1\frac{3}{8}$ inches), and De is the average or effective diameter of the tube plus already wrapped tape, upon which the tape is applied.

The angle A° so calculated is the angle of application at which the tape, when fed from the tape pad holder, will produce a smooth, non-wrinkled surface and a product of exteriorly circular cross section. The angle is measured from the horizontal and is a helix angle formed by the edge of the tape with the longitudinal axis of the tube as the reference line. In FIG. 2, a series of angles A° have been illustrated over the legend "angle for smooth application-conventional", to indicate the correct, normal angles of application that would be utilized for tapes 14 through 22 respectively, were these tapes being applied in the usual fashion designed to produce a smooth, wrinkle-free wrapping for each and every layer.

In actual practice it has been found that the angle A° may vary considerably depending upon the elongation properties of the tape and may yet produce a smooth wrapping. For the glass-fiber-and-scrim tape used in the present invention, a correct angle of application A° might vary by two degrees and would still provide a smooth, wrinkle-free wrap. Where, however, the variation exceeds 2°, wrinkling begins to appear, producing air voids within the thermal insulation.

If the angle of tape application is greater than that calculated according to the equation given above, the wrinkles will appear at the trailing edge of the tape. Similarly, if the angle is smaller than the angle calculated for correct application, the wrinkles will form at the leading edge of the tape.

On a typical taping machine the tube is passed through a rotatable taping head having a tape supply drum and passed over one or more guides to fix the angle of tape application with respect to the tube.

The angle of tape application different from that calculated as required for smooth, wrinkle-free tape application is controlled by the linear speed with which the tube passes through the rotatable taping head, the speed of the taping head, and the fractional portion of the tape width that overlaps a preceding wrap of the tape.

For a typical thermal insulating tape such as glass-fiber-and-scrim of the kind identified above, the range of angle deviation producing wrinkles on the surface of the product is 2° to 10°.

In accordance with the invention, the angle of application of the tape, for the first, second, third, and fourth tapes 14, 16, 18, and 20 respectively, is so selected as to cause the difference between the selected angle and the correct angle A° required for smooth application, to be greatest for the first or innermost tape 14, and progressively reduced in a direction radially outwardly from the tube 12. Thus, in the illustrated example, using a copper tube of the size specified and five half-lapped layers of "Cable Gard MSMS", the following table illustrates the selected angles, and the progressively reduced differences between those angles, (called the "actual angle") and the angles calculated to produce a wrinkle-free wrap (called the "calculated angle"):

| TAPE | CALCULATED ANGLE | ACTUAL ANGLE | DIFFERENCE |
| --- | --- | --- | --- |
| 14 | 42° | 53° | 9° |
| 16 | 55° | 60° | 5° |
| 18 | 63° | 67° | 4° |
| 20 | 67° | 70° | 3° |
| 22 | 71° | 71° | 0° |

This concept of reducing the difference between the actual and calculated angles in a direction radially outwardly from the core element, causes, as previously discussed with reference to FIG. 1, the wrinkling to be more pronounced at the tube surface, thus maximizing the air voids at the location which has the highest thermal gradient, with said wrinkling being progressively lessened in the radially outward direction, whereby the air voids become smaller as the thermal gradient goes down. This concept produces, it has been found in practice, a maximum enhancement of the thermal insulating characteristics of the several tape layers.

In these circumstances, it will be seen that when a 50% overlap is utilized, there are two layers for each tape. The two layers of each of the tapes are applied at the same actual angle, so as to produce, for each tape, its own annular series of randomly occurring spaces or air voids. There is, thus, a first or innermost annular series produced by the tape 14, this being the series of air voids 26; a second annular series of correspondingly randomly spaced voids 36 present in the two layers of the second tape that extend about the layers of the first tape; a third series of air voids 42 formed by the two layers of the third tape 18; and a fourth outermost annular series of air voids 50 formed by the fourth tape 20. The voids of each annular series become smaller in a direction radially outwardly from the tube, as the thermal gradient decreases, and the exteriorly circular configuration of the several wrappings begins to materialize as the wrinkles become more gradual, until ultimately, with the final wrap applied at the calculated angle desired for smooth application, the fully circular exterior shape completely materializes, ready for the extrusion of the plastic jacket to produce the desired end product.

The air voids, of course, add to the efficiency of the insulation. The insulation loses none of its normal efficiency, that is, ten layers of tape applied with a 50% overlap have a built-in insulating value, which is not decreased when the invention is practiced. Instead, by practicing the invention, the insulating value offered by the air voids is additive to the already known, fully utilized insulating value of the tape itself. This is achieved using completely conventional machinery, completely conventional tape of the same kind used for smooth, wrinkle-free application, at no increase in manufacturing cost, and without significant increase in the overall diameter of the end product. Thus, customer specifications as regards cost and design requirements can effectively be met, while increasing the thermal insulating efficiency of the wrap. No need exists for utilizing special spacers designed to produce air gaps, especially pre-wrinkled tapes, or other expedients that depart from accepted norms.

In actual testing of an insulated and jacketed tubular product of the type illustrated and described herein, having the air voids formed as illustrated and described, it was found that extremely high maintenance of the fluid temperature, from the point of entry to the point of discharge from tube 12, was achieved. The efficiency of the invention was equally high whether the tube was disposed either horizontally or vertically. It was concluded, as a result of said tests, that a tubular product, having the randomly formed air voids arranged in annular series, with the volume of space in each series being greatest immediately surrounding the tube 12 and decreasing in a direction radially outwardly from the tube, was markedly superior to a similar tubing product in which the tape wrap was applied smoothly and without wrinkles.

It will be understood that the FIG. 1 showing of the invention is exaggerated for the purpose of facilitating an understanding of the invention. In actual practice, the tape ends, when seen in cross-section, would not appear as clearly defined and would actually appear to merge into adjacent thicknesses, so that the voids now appearing in FIG. 1 beyond each tape end may obviously seem to be non-existent to the casual observer.

We claim:

1. A thermally insulated tubing product comprising a tubular core element for conveying a fluid the temperature of which is to be maintained, said tubular core element having a smooth and uninterrupted cylindrical outer surface, and a wrap of thermally insulative tape extending about said element having more than one lamination, at least more than one of said laminations being wrapped around core element at preselected helix angles to cause said laminations to be randomly wrinkled and to define random air spaces to enhance the insulating properties of said wrap, said air spaces decreasing progressively in volume in a direction taken radially outwardly from the core element.

2. A tubing product as in claim 1 in which the air spaces of said group are larger than any of said other air spaces.

3. A tubing product as in claim 1 further including a jacket protectively enclosing said core element and wrap.

4. A tubing product as in claim 3 wherein the jacket is of exteriorly circular cross-sectional configuration.

5. A thermally insulated tubing product comprising a tubular core element for conveying a fluid the temperature of which is to be maintained, said tubular core element having a smooth and uninterrupted cylindrical outer surface, and a wrap of thermally insulative tape extending about said element having more than one lamination, at least more than one of said laminations being wrapped around core element at preselected helix angles to cause said laminations to be randomly wrinkled and to define random air spaces to enhance the insulating properties of said wrap, said air spaces being arranged in a plurality of annular series each of which is generally concentric with the core element, the spaces in each series decreasing when considered in size progressively in a direction radially outwardly from the core element.

6. A thermally insulated tubing product comprising a tubular core element for conveying a fluid the temperature of which is to be maintained, said tubular core element having a smooth and uninterrupted cylindrical outer surface, and a wrap of thermally insulative tape extending about said element having more than one lamination, at least more than one of said laminations being wrapped around core element at preselected helix angles to cause said laminations to be randomly wrinkled and to define random air spaces to enhance the insulating properties of said wrap, said wrinkles and the air spaces defined thereby occurring in a plurality of annular series concentric with each other and with the core element, the total volume of the air spaces of each series being greater than the volume of the air spaces of the next succeeding series in the sense of a direction extending radially outwardly from the core element.

* * * * *